United States Patent
Guillou et al.

(10) Patent No.: US 11,111,442 B2
(45) Date of Patent: Sep. 7, 2021

(54) FISCHER-TROPSCH SYNTHESIS PROCESS COMPRISING A CATALYST PREPARED BY ADDITION OF AN ORGANIC COMPOUND IN GAS PHASE

(71) Applicant: IFP Energies nouvelles, Rueil-Malmaison (FR)

(72) Inventors: Florent Guillou, Rueil-Malmaison (FR); P-Louis Carrette, Rueil-Malmaison (FR); Bertrand Guichard, Rueil-Malmaison (FR); Damien Delcroix, Rueil-Malmaison (FR)

(73) Assignees: Total Research & Technology Feluy, Seneffe (BE); IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/662,643

(22) Filed: Oct. 24, 2019

(65) Prior Publication Data
US 2020/0131441 A1  Apr. 30, 2020

(30) Foreign Application Priority Data
Oct. 25, 2018 (FR) .................................. 18/71.301

(51) Int. Cl.
*C10G 2/00* (2006.01)
*B01J 37/02* (2006.01)
(Continued)

(52) U.S. Cl.
CPC ............ *C10G 2/332* (2013.01); *B01J 21/005* (2013.01); *B01J 21/04* (2013.01); *B01J 21/08* (2013.01);
(Continued)

(58) Field of Classification Search
None
See application file for complete search history.

(56) References Cited

U.S. PATENT DOCUMENTS

| 8,394,864 B2 | 3/2013 | Van De Loosdrecht et al. |
| 2018/0104672 A1* | 4/2018 | Chenevier ............ B01J 35/1038 |
| 2019/0143306 A1 | 5/2019 | Decottignies et al. |

FOREIGN PATENT DOCUMENTS

| FR | 3050660 A1 | 11/2017 |
| WO | WO-2017186408 A1 * | 11/2017 .......... B01J 23/8913 |

(Continued)

OTHER PUBLICATIONS

English translation WO2018072921A1, Apr. 26, 2018; pp. 1-25 (Year: 2018).*

(Continued)

*Primary Examiner* — Medhanit W Bahta
(74) *Attorney, Agent, or Firm* — Millen, White, Zelano & Branigan, P.C.; John A. Sopp

(57) ABSTRACT

A Fischer-Tropsch process for synthesizing hydrocarbons, by bringing a catalyst comprising a support and an active phase comprising a Group VIII metal into contact with a feedstock comprising synthesis gas, said catalyst being prepared according to the following steps:
a) a porous support is provided;
b) an organic compound containing oxygen and/or nitrogen is added to the porous support;
c) a step of bringing said porous support into contact with a solution containing a salt of a precursor of the phase comprising a Group VIII metal is carried out;
d) the porous support obtained at the end of step c) is dried; characterized in that step b) is carried out by bringing together said porous support and said organic compound under conditions of temperature, pressure and duration such (Continued)

that a fraction of said organic compound is transferred in the gaseous state to the porous support.

12 Claims, 1 Drawing Sheet

(51) Int. Cl.
| | |
|---|---|
| *B01J 23/75* | (2006.01) |
| *B01J 21/04* | (2006.01) |
| *B01J 21/08* | (2006.01) |
| *B01J 21/12* | (2006.01) |
| *B01J 21/14* | (2006.01) |
| *B01J 35/10* | (2006.01) |
| *B01J 23/745* | (2006.01) |
| *B01J 21/00* | (2006.01) |

(52) U.S. Cl.
CPC ............... *B01J 21/12* (2013.01); *B01J 21/14* (2013.01); *B01J 23/745* (2013.01); *B01J 23/75* (2013.01); *B01J 35/10* (2013.01); *B01J 37/0201* (2013.01); *B01J 37/0203* (2013.01); *C10G 2/331* (2013.01)

(56) References Cited

FOREIGN PATENT DOCUMENTS

| | | | |
|---|---|---|---|
| WO | WO-2018072921 A1 * | 4/2018 | .......... B01J 37/0236 |
| WO | WO-2018202467 A1 * | 11/2018 | .......... B01J 35/1038 |

OTHER PUBLICATIONS

English translation WO2018202467A1, Nov. 8, 2018; pp. 1-30 (Year: 2018).*

Search report in corresponding FR1871301 dated Apr. 6, 2019 (pp. 1-2).

Najafabadi Ali et al: Applied Catalysis A: General, Elsevier vol. 511, Nov. 18, 2015, pp. 31-46.

* cited by examiner

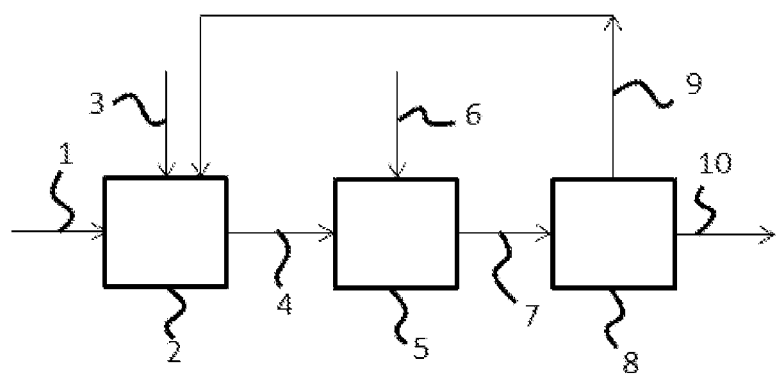

FISCHER-TROPSCH SYNTHESIS PROCESS COMPRISING A CATALYST PREPARED BY ADDITION OF AN ORGANIC COMPOUND IN GAS PHASE

TECHNICAL FIELD

The subject of the present invention is a Fischer-Tropsch synthesis process which makes it possible to obtain a wide range of hydrocarbon cuts from the CO+$H_2$ mixture, commonly referred to as synthesis gas or syngas. The Fischer-Tropsch synthesis process is carried out in the presence of a catalyst prepared according to a particular procedure.

PRIOR ART

Fischer-Tropsch synthesis processes make it possible to obtain a wide range of hydrocarbon cuts from the CO+$H_2$ mixture, commonly referred to as synthesis gas. The overall equation of Fischer-Tropsch synthesis can be written in the following way:

$$nCO+(2n+1)H_2 \rightarrow C_nH_{2n+2}+nH_2O$$

Fischer-Tropsch synthesis is at the core of processes for converting natural gas, coal or biomass into fuels or into intermediates for the chemical industry. These processes are referred to as GTL ("Gas to Liquids") in the case of the use of natural gas as initial feedstock, CTL ("Coal to Liquids") for coal, and BTL ("Biomass to Liquids") for biomass.

In each of these cases, the initial feedstock is first of all gasified into a synthesis gas which comprises a mixture of carbon monoxide and dihydrogen. The synthesis gas is subsequently converted mainly into paraffins by virtue of the Fischer-Tropsch synthesis, and these paraffins can subsequently be converted into fuels by a hydroisomerization-hydrocracking process. For example, conversion processes such as hydrocracking, deparaffinizing and hydroisomerization of heavy (C16+) cuts make it possible to produce various types of fuels in the middle-distillate range: gas oil (180-370° C. cut) and kerosene (140-300° C. cut). The lighter, C5-C15, fractions can be distilled and used as solvents.

The Fischer-Tropsch synthesis reaction can be carried out in various types of reactors (fixed-bed, mobile, or three-phase (gas, liquid, solid) for example of perfectly stirred autoclave or slurry bubble column type), and the reaction products have in particular the characteristic of being free of sulfur-comprising, nitrogenous or aromatic-type compounds.

In one embodiment in a reactor of slurry bubble column type (or else "slurry" type in a simplified expression), a divided catalyst in the form of very fine power, typically about a few tens of micrometres, is implemented, this powder forming a suspension with the reaction medium.

The Fischer-Tropsch reaction is carried out conventionally between 1 and 4 MPa (10 and 40 bar), at temperatures conventionally of between 200° C. and 350° C. The reaction is globally exothermic, which requires particular attention to the use of the catalyst.

The catalysts used in Fischer-Tropsch synthesis are usually supported catalysts based on alumina, silica or silica-alumina or combinations of these supports, the active phase mainly consisting of iron (Fe) or cobalt (Co) optionally doped with a noble metal such as Pt, Rh or Ru.

The activity and selectivity of the Fischer-Tropsch synthesis catalysts depend on the intrinsic properties of the active phase, such as the size of the metal particles and the distribution of the active phase within the support.

The most common route for preparing these catalysts consists in carrying out one or more steps of impregnation of the support with an aqueous solution of a precursor of the active phase, each generally followed by a drying step and a calcining step. Before they are used in Fischer-Tropsch synthesis reactions, these catalysts are generally reduced in order to obtain the active phase in the metal form (that is to say, in the zero valency state).

Furthermore, for the purpose of obtaining better catalytic performance properties, especially better selectivity and/or activity, it is known in the prior art to use additives of organic compound type for the preparation of metal catalysts, especially for catalysts which were prepared by impregnation optionally followed by a maturation step and followed by a drying step. Many documents describe the use of various ranges of organic compounds, such as nitrogen-containing organic compounds and/or oxygen-containing organic compounds. For example, patent application US 2005/0026776 teaches the use of chelating compounds of the following types: nitrilotriacetic acid (NTA), trans-1,2-diaminocyclohexane-N,N,N',N'-tetraacetic acid (CyDTA) or ethylenediaminetetraacetic acid (EDTA), or else glycine, aspartic acid or citric acid for obtaining a catalyst with a reduced size of $Co_3O_4$ crystallites. Other documents teach the use of polyethers (WO 2014/092278 and WO 2015/183061), glyoxylic acid (WO 2015/183059), unsaturated dicarboxylic acids (US 2011/0028575) or else of multifunctional carboxylic acids of formula HOOC—(CRR')$_n$—COOH with n≥1 in the preparation of Fischer-Tropsch synthesis catalysts (WO 98/47618).

The processes for preparing additivated catalysts typically use an impregnation step in which the organic compound is introduced, optionally in solution in a solvent, so as to fill the entire porosity of the support, optionally impregnated with metal precursors, in order to obtain a homogeneous distribution. This inevitably results in using large amounts of compound or in diluting the organic compound in a solvent. After impregnation, a drying step is then necessary to eliminate the excess compound or the solvent and thus free the porosity needed for the use of the catalyst. Added to the additional cost linked to the excess organic compound or to the use of a solvent is the cost of an additional, energy-consuming separate preparation step of drying. During the drying step, the evaporation of the solvent may also be accompanied by a partial loss of the organic compound by vaporization and therefore by a loss of catalytic activity.

The Applicant has discovered, surprisingly, that a catalyst comprising an active phase based on at least one Group VIII metal, preferably cobalt, supported on an oxide matrix prepared using a preparation process comprising at least one step of addition of an organic compound onto the porous support by impregnation in the gas phase makes it possible to obtain at least as good, or even better, performance in terms of activity and/or selectivity in Fischer-Tropsch synthesis than the processes known from the prior art. Without wishing to be bound by any theory, it appears that the gas phase addition of the organic additive during the preparation of the catalyst makes it possible to obtain at least as good, or even better, Fischer-Tropsch synthesis performance in terms of activity and/or selectivity, than known catalysts, the preparation process of which comprises a step of addition of the same organic additive by the liquid route (for example by dry impregnation), even though the size of the particles of the active phase obtained on the catalyst (measured in their oxide forms) is equivalent.

Subjects of the Invention

The subject of the present invention is a Fischer-Tropsch process for synthesizing hydrocarbons, by bringing a catalyst comprising a porous support and an active phase comprising at least one Group VIII metal into contact with a feedstock comprising synthesis gas under a total pressure of between 0.1 and 15 MPa, under a temperature of between 150 and 350° C., and at an hourly space velocity of between 100 and 20 000 volumes of synthesis gas per volume of catalyst and per hour with an $H_2$/CO molar ratio of the synthesis gas of between 0.5 and 4, said catalyst being prepared according to at least the following steps:

a) a porous support is provided, containing silica, alumina, and at least one partial or non-partial single spinel phase $MAl_2O_4$ or mixed spinel phase $M_xM'_{(1-x)}Al_2O_4$ in which M and M' are distinct metals selected from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values of 0 and 1 themselves being excluded;

b) at least one organic compound containing oxygen and/or nitrogen, but not comprising sulfur, is added to the porous support;

c) a step of bringing said porous support into contact with at least one solution containing at least one salt of a precursor of the phase comprising at least one Group VIII metal is carried out;

d) the porous support obtained at the end of step c) is dried; characterized in that step b) is carried out before or after steps c) and d) and is carried out by bringing together said porous support and said organic compound under conditions of temperature, pressure and duration such that a fraction of said organic compound is transferred in the gaseous state to the porous support.

In a variant embodiment according to the invention, step b) is carried out by the simultaneous bringing together of said porous support and said organic compound in the liquid state and without physical contact between said porous support and said organic compound in the liquid state, at a temperature below the boiling point of said organic compound and under conditions of pressure and duration such that a fraction of said organic compound is transferred in the gaseous state to the porous support.

Preferably, step b) is carried out by means of a unit for adding said organic compound comprising a first compartment and a second compartment that are in communication so as to allow the passage of a gaseous fluid between the compartments, the first compartment containing the porous support and the second compartment containing the organic compound in the liquid state.

Preferably, the unit comprises a chamber that includes the first and second compartments, the two compartments being in gaseous communication.

Preferably, the unit comprises two chambers that respectively form the first and second compartments, the two chambers being in gaseous communication.

Preferably, step b) is carried out in the presence of a stream of a carrier gas circulating from the second compartment into the first compartment.

According to a second variant embodiment according to the invention, step b) is carried out by bringing said porous support together with a porous solid comprising said organic compound under conditions of temperature, pressure and duration such that a fraction of said organic compound is transferred gaseously from said porous solid to said porous support.

Preferably, step b) is carried out by bringing said porous support together with said porous solid comprising said organic compound, without physical contact.

Preferably, during step b), the porous support and the porous solid comprising said organic compound are of different porosity and/or chemical nature.

Preferably, at the end of step b), the porous solid containing the organic compound is separated from said porous support and is returned to step b).

Advantageously, said organic compound is chosen from a compound comprising one or more chemical functions chosen from a carboxylic, alcohol, ester, amine, amide, ether, dilactone, carboxyanhydride, aldehyde, ketone, nitrile, imide, oxime or urea function.

Advantageously, said organic compound comprises at least one carboxylic function chosen from ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

Advantageously, said organic compound comprises at least one alcohol function chosen from methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

Advantageously, said organic compound comprises at least one ester function chosen from a γ-lactone or a δ-lactone containing between 4 and 8 carbon atoms, γ-butyrolactone, γ-valerolactone, methyl laurate, dimethyl malonate, dimethyl succinate and propylene carbonate.

Advantageously, said organic compound comprises at least one amine function chosen from aniline, ethylenediamine, diaminohexane, tetramethylenediamine, hexamethylenediamine, tetramethylethylenediamine, tetraethylethylenediamine, diethylenetriamine and triethylenetetramine.

Advantageously, said organic compound comprises at least one amide function chosen from formamide, N-methylformamide, N,N-dimethylformamide, 2-pyrrolidone, N-methyl-2-pyrrolidone, gamma-valerolactam and N,N'-dimethylurea.

Advantageously, said organic compound comprises at least one carboxyanhydride function chosen from the group of the O-carboxyanhydrides consisting of 5-methyl-1,3-dioxolane-2,4-dione and 2,5-dioxo-1,3-dioxolane-4-propanoic acid, or from the group of the N-carboxyanhydrides consisting of 2,5-oxazolidinedione and 3,4-dimethyl-2,5-oxazolidinedione.

Advantageously, said organic compound comprises at least one dilactone function chosen from the group of the cyclic dilactones having 4 ring members consisting of 1,2-dioxetanedione, or from the group of the cyclic dilactones having 5 ring members consisting of 1,3-dioxolane-4,5-dione, 1,5-dioxolane-2,4-dione, and 2,2-dibutyl-1,5-dioxolane-2,4-dione, or from the group of the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, or from the group of the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

Advantageously, said organic compound comprises at least one ether function comprising at most two ether functions and not comprising any hydroxyl groups, chosen from the group of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of the cyclic ethers consisting of tetrahydrofuran, 1,4-dioxane and morpholine.

BRIEF DESCRIPTION OF THE FIGURES

The FIGURE is a schematic illustration of an embodiment of step b) of the process for preparing the catalyst used in the context of the Fischer-Tropsch synthesis process according to the invention.

DETAILED DESCRIPTION

Definitions

"Macropores" is understood to mean pores, the opening of which is greater than 50 nm.

"Mesopores" is understood to mean pores, the opening of which is between 2 nm and 50 nm, limits included.

"Micropores" is understood to mean pores, the opening of which is less than 2 nm.

Total pore volume of the catalyst or of the support used for the preparation of the catalyst according to the invention is understood to mean the volume measured by intrusion with a mercury porosimeter according to Standard ASTM D4284-83 at a maximum pressure of 4000 bar (400 MPa), using a surface tension of 484 dyne/cm and a contact angle of 140°. The wetting angle was taken equal to 140° by following the recommendations of the work "Techniques de l'ingénieur, traité analyse et caractérisation" [Techniques of the Engineer, Analysis Treatise and Characterization], pages 1050-1055, written by Jean Charpin and Bernard Rasneur.

In order to obtain better accuracy, the value of the total pore volume corresponds to the value of the total pore volume measured by intrusion with a mercury porosimeter measured on the sample minus the value of the total pore volume measured by intrusion with a mercury porosimeter measured on the same sample for a pressure corresponding to 30 psi (approximately 0.2 MPa).

The volume of the macropores and of the mesopores is measured by porosimetry by intrusion of mercury according to Standard ASTM D4284-83 at a maximum pressure of 4000 bar (400 MPa), using a surface tension of 484 dyne/cm and a contact angle of 140°. The value from which the mercury fills all the intergranular voids is set at 0.2 MPa and it is considered that, above this, the mercury penetrates into the pores of the sample.

The macropore volume of the catalyst or of the support used for the preparation of the catalyst according to the invention is defined as being the cumulative volume of mercury introduced at a pressure of between 0.2 MPa and 30 MPa, corresponding to the volume present in the pores with an apparent diameter of greater than 50 nm.

The mesopore volume of the catalyst or of the support used for the preparation of the catalyst according to the invention is defined as being the cumulative volume of mercury introduced at a pressure of between 30 MPa and 400 MPa, corresponding to the volume present in the pores with an apparent diameter of between 2 and 50 nm.

The volume of the micropores is measured by nitrogen porosimetry. The quantitative analysis of the microporosity is performed using the "t" method (method of Lippens-De Boer, 1965), which corresponds to a transform of the starting adsorption isotherm, as described in the publication "Adsorption by powders and porous solids. Principles, methodology and applications", written by F. Rouquérol, J. Rouquérol and K. Sing, Academic Press, 1999.

The median mesopore diameter is also defined as being the diameter such that all the pores, among the combined pores constituting the mesopore volume, with a size of less than this diameter constitute 50% of the total mesopore volume determined by intrusion with a mercury porosimeter.

The median macropore diameter is also defined as being the diameter such that all the pores, among the combined pores constituting the macropore volume, with a size of less than this diameter constitute 50% of the total macropore volume determined by intrusion with a mercury porosimeter.

The specific surface of the catalyst or of the support used for the preparation of the catalyst according to the invention is understood to mean the BET specific surface determined by nitrogen adsorption in accordance with Standard ASTM D 3663-78 drawn up from the Brunauer-Emmett-Teller method described in the journal "The Journal of the American Chemical Society", 60, 309 (1938).

Size of the cobalt nanoparticles is understood to mean the mean diameter of the cobalt crystallites measured in their oxide forms. The mean diameter of the cobalt crystallites in oxide form is determined by X-ray diffraction, from the width of the diffraction line located at the angle 2θ-43° (i.e. along the crystallographic direction [200]) using the Scherrer equation. This method, used in X-ray diffraction on polycrystalline samples or powders, which links the full width at half maximum of the diffraction peaks to the size of the particles, is described in detail in the reference: Appl. Cryst. (1978), 11, 102-113, "Scherrer after sixty years: A survey and some new results in the determination of crystallite size", J. I. Langford and A. J. C. Wilson.

Hereinafter, groups of chemical elements are given according to the CAS classification (CRC Handbook of Chemistry and Physics, published by CRC Press, Editor in Chief D. R. Lide, 81st edition, 2000-2001). For example, Group VIII according to the CAS classification corresponds to the metals of columns 8, 9 and 10 according to the new IUPAC classification.

Description of the Catalyst Preparation Process

Generally speaking, the process for preparing the catalyst used in the context of the Fischer-Tropsch synthesis process according to the invention comprises at least the following steps:

a) a porous support is provided, containing silica, alumina, and at least one partial or non-partial single spinel $MAl_2O_4$ or mixed spinel phase $M_xM'_{(1-x)}Al_2O_4$ in which M and M' are distinct metals selected from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values of 0 and 1 themselves being excluded;

b) at least one organic compound containing oxygen and/or nitrogen, but not comprising sulfur, is added to said porous support;

c) a step of bringing said porous support into contact with at least one solution containing at least one salt of a precursor of the active phase comprising at least one Group VIII metal is carried out;

d) the porous support obtained at the end of step c) is dried; characterized in that step b) is carried out:

before or after steps c) and d); and by bringing together said porous support and said organic compound under conditions of temperature, pressure and duration such that at least one fraction of said organic compound is transferred in the gaseous state to the porous support.

Steps a) and d) of the process for preparing the catalyst used in the context of the Fischer-Tropsch synthesis process according to the invention are described in more detail below.

Step a)

According to step a) of the process for preparing the catalyst used in the context of the invention, a porous support is provided, containing silica, alumina, and at least one partial or non-partial single spinel $MAl_2O_4$ or mixed spinel phase $M_xM'_{(1-x)}Al_2O_4$ in which M and M' are distinct metals selected from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values of 0 and 1 themselves being excluded.

More particularly, step a) comprises the following sub-steps:

a1) an oxide support containing alumina and silica is provided;

a2) the support containing alumina and silica is impregnated with an aqueous or organic solution comprising at least one salt of metal M or M' chosen from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), then drying is carried out at a temperature of between 60° C. and 200° C. and calcining is carried out at a temperature between 700 and 1200° C., so as to obtain a partial or non-partial single spinel phase $MAl_2O_4$ or mixed spinel phase $M_xM'_{(1-x)}Al_2O_4$ in which M and M' are distinct metals and in which x is between 0 and 1, the values of 0 and 1 themselves being excluded.

According to step a1) a support containing alumina and silica is provided. The content of silica $SiO_2$ may vary from 0.5% by weight to 30% by weight, preferably from 1% by weight to 30% by weight, and more preferably still from 1.5 to 20% by weight relative to the weight of the support. Preferably, a silica-alumina support is provided. Such a support may be bought or manufactured, for example by spraying an alumina precursor in the presence of a compound comprising silicon. The support containing alumina and silica may be prepared by any other means known to those skilled in the art, for example by impregnation of an organosilylated compound of TEOS (tetraethylorthosilicate) type onto an alumina. In this case, this impregnation, followed by drying and calcining, is preliminary to step a) described above.

The solid containing alumina and silica may subsequently be dried and calcined. The drying is advantageously carried out at a temperature between 60° C. and 200° C., preferably for a period ranging from 30 minutes to three hours. The calcining is advantageously carried out at a temperature between 200° C. and 1100° C., preferably for a period ranging from 1 hour to 24 hours, and preferably from 2 hours to 8 hours. The calcining is generally carried out under an oxidizing atmosphere, for example in air, or in oxygen-depleted air; it may also be carried out at least partly under nitrogen.

All the steps of drying and calcining described in the present description may be carried out by any technique known to those skilled in the art: fixed bed, fluidized bed, oven, muffle furnace, rotary oven.

Step a2) consists of the impregnation, preferably dry impregnation, of said support containing alumina and silica with an aqueous solution of one or more salts of a metal M or M' chosen from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), preferably cobalt, nickel, magnesium, calcium and zinc and very preferably cobalt and nickel, and particularly preferably cobalt, followed by drying at a temperature of between 60° C. and 200° C. and calcining at a temperature of between 700 and 1200° C.

The metal M or M' is brought into contact with the support by means of any metal precursor that is soluble in the aqueous phase. Preferably, when the metal M or M' belongs to Group VIIIB, then the precursor of the Group VIIIB metal is introduced in aqueous solution, preferably in the nitrate, carbonate, acetate, chloride, or oxalate form, in the form of complexes formed by a polyacid or an acid alcohol and its salts, of complexes formed with acetylacetonates or of any other inorganic derivative soluble in aqueous solution, which is brought into contact with said support. In the preferred case in which the metal M is cobalt, the cobalt precursor advantageously used is cobalt nitrate, cobalt oxalate or cobalt acetate.

The content of metal M or M' is advantageously between 1 and 20% by weight and preferably between 2 and 10% by weight relative to the total mass of the final support.

The drying is advantageously carried out at a temperature between 60° C. and 200° C., preferably for a period ranging from 30 minutes to three hours.

The calcining is carried out at a temperature between 700 and 1200° C., preferably between 850 and 1200° C., and preferably between 850 and 900° C., generally for a period of between one hour and 24 hours and preferably between 2 hours and 5 hours. The calcining is generally carried out under an oxidizing atmosphere, for example in air, or in oxygen-depleted air; it may also be carried out at least partly under nitrogen. It makes it possible to convert the M and M' precursors and the alumina into a spinel-type structure (M and M' aluminate).

By calcining at very high temperature, the single spinel phase $MAl_2O_4$ or mixed spinel phase $M_xM'_{(1-x)}Al_2CO_4$ formed stabilizes the whole support. The metals M and M' contained in the spinel phase cannot be reduced during the final activation of the Fischer-Tropsch catalyst (reduction). The metal M or M' contained in the single spinel phase $MAl_2O_4$ or mixed spinel phase $M_xM'_{(1-x)}Al_2O_4$ therefore does not constitute the active phase of the catalyst.

According to one variant, the calcining may also be carried out in two steps, said calcining being advantageously carried out at a temperature between 300° C. and 600° C. in air for a period of between half an hour and three hours, and then at a temperature between 700° C. and 1200° C., preferably between 850 and 1200° C. and preferably between 850 and 900° C., generally for a period of between one hour and 24 hours, and preferably of between 2 hours and 5 hours.

Thus, at the end of said step a2), said support containing alumina and silica also contains at least one partial or non-partial single spinel phase $MAl_2O_4$ or mixed spinel phase $M_xM'_{(1-x)}Al_2O_4$, in which the metals M and M' are in the form of aluminates.

Step b)

Any organic compound containing oxygen and/or nitrogen but not comprising sulfur which is in the liquid state at the temperature and pressure that are implemented in the step of adding the organic compound to the porous support may be used in the process for preparing the catalyst.

Preferably, said organic compound is chosen from a compound comprising one or more chemical functions chosen from a carboxylic, alcohol, ester, amine, amide, ether, dilactone, carboxyanhydride, aldehyde, ketone, nitrile, imide, oxime or urea function.

When said organic compound comprises at least one or more carboxylic functions, said organic compound may be chosen from ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

When said organic compound comprises at least one or more alcohol functions, said organic compound may be chosen from methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

When said organic compound comprises at least one or more ester functions, said organic compound may be chosen from a γ-lactone or a δ-lactone containing between 4 and 8 carbon atoms, γ-butyrolactone, γ-valerolactone, methyl laurate, dimethyl malonate, dimethyl succinate and propylene carbonate.

When the organic compound comprises at least one or more amine functions, said organic compound may be chosen from aniline, ethylenediamine, diaminohexane, tetramethylenediamine, hexamethylenediamine, tetramethylethylenediamine, tetraethylethylenediamine, diethylenetriamine and triethylenetetramine.

When the organic compound comprises at least one or more amide functions, said organic compound may be chosen from formamide, N-methytformamide, N,N-dimethytformamide, 2-pyrrolidone, N-methyl-2-pyrrolidone, gamma-valerolactam and N,N'-dimethylurea.

When the organic compound comprises at least one or more ether functions, said organic compound may be chosen from organic compounds comprising at most two ether functions and not comprising any hydroxyl groups, chosen from the group of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of the cyclic ethers consisting of tetrahydrofuran, 1,4-dioxane and morpholine.

When the organic compound comprises a dilactone function, said organic compound may be chosen from the group of the cyclic dilactones having 4 ring members consisting of 1,2-dioxetanedione, or from the group of the cyclic dilactones having 5 ring members consisting of 1,3-dioxolane-4,5-dione, 1,5-dioxolane-2,4-dione, and 2,2-dibutyl-1,5-dioxolane-2,4-dione, or from the group of the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, or from the group of the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

When the organic compound comprises a carboxyanhydride function, said organic compound may be chosen from the group of the O-carboxyanhydrides consisting of 5-methyl-1,3-dioxolane-2,4-dione and 2,5-dioxo-1,3-dioxolane-4-propanoic acid, or from the group of the N-carboxyanhydrides consisting of 2,5-oxazolidinedione and 3,4-dimethyl-2,5-oxazolidinedione. Carboxyanhydride is understood to mean a cyclic organic compound comprising a carboxyanhydride function, that is to say a —CO—O—CO—X— or —X—CO—O—CO— sequence within the ring, with —CO— corresponding to a carbonyl function and X able to be an oxygen or nitrogen atom. For X=O, reference is made to an O-carboxyanhydride, and when X=N, reference is made to an N-carboxyanhydride.

The addition of the organic compound to the porous support may be carried out by two variant embodiments described in detail below.

Variant 1

According to a first embodiment according to the invention, the Fischer-Tropsch synthesis process is carried out in the presence of a catalyst obtained by a preparation process in which step b) is carried out by the simultaneous bringing together of said porous support and said organic compound in the liquid state, and without physical contact, at a temperature below the boiling point of said organic compound and under conditions of pressure and duration such that a fraction of said organic compound is transferred in the gaseous state to the porous support.

In this embodiment, the process for adding the organic compound does not involve a conventional step of impregnation using a solution containing a solvent in which the organic compound is diluted. Consequently, it is not necessary to carry out a step of drying the porous support with a view to eliminating the solvent, resulting in a process that is more economical in terms of hot utility and raw material. Moreover, according to this embodiment, the step of adding the organic compound is carried out at a temperature below the boiling point of said organic compound, which affords a substantial gain from an energy point of view and in terms of safety. Specifically, for many organic compounds, such as for example the ethylene glycol cited in this document, the flash point is below the boiling point. There is therefore a risk of fire when working at a temperature above the boiling point of the organic compound. Furthermore, a high temperature may also lead to a partial or complete decomposition of the organic compound, greatly reducing its effect. For example citric acid, commonly used as an organic additive (US 2009/0321320), decomposes at 175° C. whereas its boiling point is 368° C. at atmospheric pressure. The preparation process according to this variant is also characterized by the fact that the addition of the organic compound to the porous solid is carried out without physical contact with the organic compound in the liquid state, that is to say without impregnation of the porous support by the liquid. The process is based on the principle of the existence of a vapour pressure of the organic compound which is generated by its liquid phase at a given temperature and a given pressure. Thus, a portion of the molecules of organic compound in the liquid state passes into the gaseous state (vaporization) and is then transferred (gaseously) to the porous support. This bringing-together step b) is carried out for a period sufficient to attain the targeted content of organic compound in the porous solid which is used as catalyst support.

In this embodiment, the step of adding the organic compound to a porous support may be carried out in a unit for adding said organic compound. The addition unit used comprises a first compartment and a second compartment that are in communication so as to allow the passage of a gaseous fluid between the two compartments, the first compartment being suitable for containing the porous support and the second compartment being suitable for containing the organic compound in liquid form. In this embodiment, the process comprises a step b) in which the porous support and the organic compound in liquid form are brought together without physical contact between the porous support and the organic compound in liquid form, at a temperature below the boiling point of the organic compound and under conditions of pressure and duration such that a fraction of said organic compound is transferred gaseously to the porous solid by circulation of a stream of organic compound in gaseous form from the second compartment into the first compartment, so as to ultimately provide a porous support containing the organic compound.

According to one embodiment, the addition unit comprises a chamber that includes the first and second compartments, the compartments being in gaseous communication. For example, the compartments are arranged side by side and separated by a partition, for example a substantially vertical partition, attached to the bottom of the chamber and extending only over a fraction of the height of the chamber so as to allow the gaseous overhead to diffuse from one compartment to the other. Alternatively, the compartments are arranged one on top of the other and are in communication so as to allow the passage of the organic compound in the gaseous state between the two compartments. Preferably, the chamber is closed.

According to another embodiment, the addition unit comprises two chambers that respectively form the first and second compartments, the two chambers being in gaseous communication, for example by means of a duct. Preferably, the two chambers are closed.

Preferably, the compartment intended to contain the liquid organic compound comprises means for setting said liquid in motion in order to facilitate the transfer of the organic compound in the gaseous state from one compartment to the other. According to one preferred embodiment, the two compartments comprise means for respectively setting the liquid and the porous support in motion. Advantageously, the compartment containing the organic compound in the liquid state is equipped with internals intended to maximize the surface area of the gas/liquid interface. These internals are for example porous monoliths impregnated by capillary action, falling films, packings or any other means known to those skilled in the art.

In a preferred embodiment, step b) is carried out in the presence of a "carrier" gas circulating from the second compartment into the first compartment so as to entrain the organic molecules in the gaseous state into the compartment containing the porous support. For example, the carrier gas may be chosen from carbon dioxide, ammonia, air with a controlled moisture content, an inert gas such as argon, nitrogen, hydrogen, natural gas or a refrigerant gas according to the classification published by IUPAC.

According to a preferred embodiment, step b) comprises a step in which a gaseous effluent containing said organic compound is withdrawn from the first compartment and the effluent is recycled to the first and/or the second compartment.

According to another embodiment, a gaseous effluent containing said organic compound in the gaseous state is withdrawn from the first compartment, said effluent is condensed so as to recover a liquid fraction containing the organic compound in the liquid state, and said liquid fraction is recycled to the second compartment.

Step b) is preferably carried out at an absolute pressure of between 0.1 and 1 MPa. As specified above, the temperature of step b) is set at a temperature below the boiling point of the organic compound. The temperature of step b) is generally below 200° C., preferably between 10° C. and 150° C., more preferably between 25° C. and 120° C.

Variant 2

According to a second embodiment according to the invention, the Fischer-Tropsch synthesis process is carried out in the presence of a catalyst obtained by a preparation process in which step b) is carried out by bringing said porous support together with a porous solid (also referred to here as "carrier solid") comprising said organic compound, said carrier solid preferably being different from the porous support serving as support for the final catalyst, under conditions of temperature, pressure and duration such that a fraction of said organic compound is transferred gaseously from said carrier solid to said porous support.

The aim of this bringing together of the porous support and the carrier solid comprising the organic compound is to enable a gaseous transfer of a portion of the organic compound contained in the carrier solid to the porous support. This step is based on the principle of the existence of a vapour pressure of the organic compound at a given temperature and a given pressure. Thus, a portion of the molecules of organic compound of the carrier solid comprising the organic compound passes into gaseous form (vaporization) and is then transferred (gaseously) to the porous support. According to this embodiment, the porous solid ("carrier solid") serves as a source of organic compound to enrich, in organic compound, the porous support, which preferably does not initially comprise organic compound. This embodiment is therefore different from a simple maturation step as conventionally encountered in the prior art. Indeed, the diffusion of the organic compound from the carrier solid to the porous support occurs inter-granularly, unlike a conventional maturation for which the diffusion of the organic compound occurs intra-granularly. Such a definition of maturation is illustrated in the thesis by Jonathan Moreau, "Rationalisation de l'étape d'imprégnation de catalyseurs à base d'hétéropolyanions de molybdène supportés sur alumine" [*Rationalization of the step of impregnation of catalysts based on molybdenum heteropolyanions supported on alumina*]; page 56; Université Claude Bernard—Lyon I, 2012.

Moreover, the use of such a step of contacting, i.e. by gaseous transfer, between the porous solid comprising the organic compound and the porous support makes it possible to save on a drying step which would conventionally have taken place after a step of impregnation of the organic compound diluted in a solvent on the porous support (optionally followed by a maturation step) in order to eliminate the solvent used. Indeed, in this embodiment, the porous solid ("carrier solid") comprising the organic compound is obtained by impregnation with the organic compound in the liquid state. Unlike the prior art, the organic compound is not diluted in a solvent. One advantage of this embodiment compared to the prior art processes therefore lies in the absence of a drying step which is conventionally used for eliminating the solvent after the impregnation step and therefore of being less energy-consuming compared to conventional processes. This absence of drying step makes it possible to prevent possible losses of organic compound by vaporization or even by degradation.

The volume of organic compound used is strictly less than the total volume of the accessible porosity of the porous solid and of the porous support used in step b) and is set relative to the targeted amount of organic compound on the porous solid at the end of step b). Another advantage of this embodiment is therefore the use of a smaller amount of organic compound relative to the case of the prior art where, in the absence of solvent, the entire porosity would have to be filled with organic compound.

The weight ratio of (porous solid comprising the organic compound)/(porous support) depends on the pore distribution of the porous solid and the porous support and on the aim in terms of targeted amount of organic compound on the porous support. This weight ratio is generally less than or equal to 10, preferably less than 2 and more preferably still between 0.05 and 1, limits included.

In this embodiment, step b) is carried out under conditions of temperature, pressure and duration so as to achieve a balance between the amount of organic compound on the porous solid ("carrier solid") and the porous support. The term "balance" is understood to denote the fact that at the end of step b) at least 50% by weight of the porous solid and the porous support have an amount of said organic compound equal to plus or minus 50% of the targeted amount, preferably at least 80% by weight of the porous solid and the porous support have an amount of said organic compound equal to plus or minus 40% of the targeted amount and more preferentially still at least 90% by weight of the porous solid and the porous support have an amount of said organic compound equal to plus or minus 20% of the targeted amount.

By way of nonlimiting example, in the case in which the preparation of a porous support comprising 5% by weight of organic compound is targeted, it is possible to bring together, in a same amount, a porous solid containing 10% by weight of organic compound with the porous support free of said organic compound. It will be considered in this case that the balance is achieved when at least 50% by weight of the porous solid and the porous support have an amount of said organic compound which corresponds to a content of between 2.5% and 7.5% by weight, preferentially when at least 80% by weight of the porous solid and the porous support have an amount of said organic compound which corresponds to a content of between 3% and 7% by weight, and more preferentially still when at least 90% by weight of the porous solid and the porous support have an amount of said organic compound which corresponds to a content of between 4% and 6% by weight.

These contents may be determined by a statistically representative sampling for which the samples may be characterized for example by assaying of the carbon and/or possible heteroatoms contained in the organic compound or by thermogravimetry coupled to an analyser, for example a mass spectrometer, or an infrared spectrometer and thus determine the respective contents of organic compounds.

Step b) is preferably carried out under controlled temperature and pressure conditions and so that the temperature is below the boiling point of said organic compound to be transferred gaseously.

Preferably, the operating temperature is below 150° C. and the absolute pressure is generally between 0.1 and 1 MPa, preferably between 0 and 0.5 MPa and more preferably between 0.1 and 0.2 MPa. It is thus possible to carry out the bringing-together step in an open or closed chamber, optionally with a control of the composition of the gas present in the chamber. When the step of bringing together the porous solid and the porous support is carried out in an open chamber, it will be ensured that the entrainment of the organic compound out of the chamber is limited as much as possible. Alternatively, the step of bringing together the porous solid and the porous support may be carried out in a closed chamber, for example in a container for storing or transporting the solid that is impermeable to gas exchanges with the outside environment. In this embodiment, the bringing-together step may be carried out by controlling the composition of the gas forming the atmosphere by introducing one or more gaseous compounds optionally with a controlled moisture content. As nonlimiting example, the gaseous compound may be carbon dioxide, ammonia, air with a controlled moisture content, an inert gas such as argon, nitrogen, hydrogen, natural gas or a refrigerant gas according to the classification published by IUPAC. According to one advantageous embodiment, the step of bringing together in a controlled gaseous atmosphere uses a forced circulation of the gas in the chamber.

In one embodiment of this variant embodiment, the step of bringing together the porous solid and the porous support is carried out without physical contact in a chamber equipped with compartments suitable for containing, respectively, the porous solid ("carrier solid") and the porous support, the compartments being in communication so as to allow the passage of the organic compound in the gaseous state between the two compartments. It is advantageous to circulate a gas stream firstly through the compartment containing the porous solid comprising the organic compound then through the compartment containing the porous support.

Preferably, the porous solid (carrier solid) is of a different nature than the porous solid (serving as catalyst support); that is to say that the porous solid has at least one distinguishing physical feature with regard to the porous support, in order to enable for example the subsequent separation thereof. For example and nonlimitingly, this physical feature may be:
  the size of the particles of the solid: the separation may be carried out through a screen;
  magnetism: the separation is carried out by the application of a magnetic field;
  the density of the solid: optionally in conjunction with the size of the particles, this difference in density may for example be used for a separation via elutriation.

Moreover, said porous support and said porous solid containing the organic compound may advantageously be of different porosity and/or chemical nature. Indeed, the porous solid may be of a suitable chemical composition to restrict adsorption of the compound to be impregnated compared to the adsorption of the compound to be impregnated on the porous support. A similar effect may be obtained by adapting the porous structure of the porous solid so that it has a mean pore opening that is greater than that of the porous support so as to favour the transfer of the organic compound to the porous support, particularly in the case of a mechanism involving capillary condensation.

One embodiment of step b) of bringing the organic compound and the porous support together is illustrated schematically in the FIGURE. This embodiment according to the invention corresponds to the case in which the porous solid containing the organic compound acts as a reservoir of organic compound for the porous support. As indicated in the FIGURE, a "carrier" porous solid 1 is impregnated in an impregnation unit 2 with a liquid organic compound supplied by the line 3. The carrier solid 4 comprising the organic compound is transferred into the addition unit 5 in which said carrier solid is brought together with the porous support supplied by the line 6. At the end of the step of bringing the porous solid and the porous support together, a mixture of porous support and porous solid (carrier sold), each containing said organic compound, is withdrawn from the unit by the line 7. The mixture of solids (porous support and porous solid) is then sent to a separation unit 8 which carries out a physical separation of the solids (porous solid and porous support). Owing to the use of the separation, two streams of solids are obtained, namely the porous solid 9 containing the organic compound and the porous support 10 also containing the organic compound. In accordance with this embodiment, the porous solid still containing the organic compound 9 is recycled to the unit for introducing the liquid organic compound with a view to subsequent use.

Step c)

Step c) of bringing said porous support into contact with at least one solution containing at least one salt of a precursor of the phase comprising at least one Group VIII metal may be carried out by dry impregnation or excess impregnation according to methods well known to those skilled in the art. Said step c) is preferentially carried out by bringing the porous support into contact with at least one solution, which is aqueous or organic (for example methanol or ethanol or phenol or acetone or toluene or dimethyl sulfoxide (DMSO)) or else consists of a mixture of water and of at least one organic solvent, containing at least one precursor of the active phase comprising at least one Group VIII metal at least partially in the dissolved state, or else in bringing a precursor of the active phase into contact with at least one colloidal solution of at least one Group VIII metal precursor, in the oxidized form (nanoparticles of oxides, of oxy(hydroxide) or of hydroxide of the cobalt) or in the reduced form (metal nanoparticles of the Group VIII metal in the reduced state). Preferably, the solution is aqueous. The pH of this solution may be modified by the optional addition of an acid or of a base. According to another preferred alternative form, the aqueous solution may contain ammonia or ammonium $NH_4^+$ ions.

Preferably, said step c) is carried out by dry impregnation, which consists in bringing the porous support into contact with at least one solution containing at least one precursor of the active phase comprising at least one Group VIII metal, of which the volume of the solution is between 0.25 and 1.5 times the pore volume of the support of the catalyst precursor to be impregnated.

Preferably, the Group VIII metal is chosen from iron or cobalt. More preferentially, the Group VIII metal is cobalt.

When the precursor of the active phase is introduced in aqueous solution and when the Group VIII metal is cobalt, use is advantageously made of a cobalt precursor in the nitrate, carbonate, chloride, sulfate, hydroxide, hydroxycarbonate, formate, acetate or oxalate form, in the form of complexes formed with acetylacetonates, or in the form of any other inorganic derivative which is soluble in aqueous solution, which is brought into contact with said catalyst precursor. Use is advantageously made, as cobalt precursor, of cobalt nitrate, cobalt carbonate, cobalt chloride, cobalt hydroxide or cobalt hydroxycarbonate. Very preferably, the cobalt precursor is cobalt nitrate.

The amounts of the cobalt precursor(s) introduced into the solution are chosen such that the content of cobalt element is between 2% and 40% by weight, preferably between 5% and 30% by weight, and more preferably between 10% and 25% by weight expressed as metal cobalt element relative to the total weight of the catalyst.

Advantageously, the molar ratio of said organic compound introduced in step b) to the Group VIII metal introduced in step c) is between 0.01 and 5.0 mol/mol, preferably between 0.05 and 2.0 mol/mol, more preferentially between 0.1 and 1.5 mol/mol and more preferentially still between 0.3 and 1.2 mol/mol, relative to the Group VIII element.

Drying Step d)

The drying step d) is carried out at a temperature below 200° C., advantageously between 50° C. and 180° C., preferably between 70° C. and 150° C., very preferably between 75° C. and 130° C. The drying step is preferentially carried out for a period of between 1 hour and 4 hours.

The drying step can be carried out by any technique known to those skilled in the art. It is advantageously carried out under an inert atmosphere or under an oxygen-containing atmosphere or under a mixture of inert gas and oxygen. It is advantageously carried out at atmospheric pressure or at reduced pressure. Preferably, this step is carried out at atmospheric pressure and in the presence of air or nitrogen.

Step e)—Calcining (Optional)

Optionally, on conclusion of the drying step d), a calcining step e) is carried out at a temperature of between 250° C. and 1000° C., preferably of between 250° C. and 750° C., under an inert atmosphere or under an oxygen-containing atmosphere. The duration of this heat treatment is generally between 15 minutes and 10 hours. Longer periods of time are not ruled out but do not necessarily contribute an improvement. After this treatment, the cobalt of the active phase is thus in the oxide form.

Characteristics of the Catalyst

The catalyst used in the context of the process according to the invention comprises an active phase comprising at least one Group VIII metal, of which the content of said metal is between 2% and 40% by weight, preferably between 5% and 30% by weight, and even more preferably between 10% and 25% by weight expressed as metal element relative to the total weight of the catalyst. Preferably, the Group VIII metal is cobalt. More preferentially, the active phase consists of cobalt.

The porous support of the catalyst employed for carrying out the hydrocarbon synthesis process according to the invention is an oxide support containing alumina, silica and at least one spinel as described above.

The support containing alumina, silica, at least one spinel as described above, may be prepared from alumina regardless of the specific surface area thereof and the nature of the pore distribution thereof. The specific surface area of the alumina from which the support is prepared is generally between 50 m²/g and 500 m²/g, preferably between 100 m²/g and 300 m²/g, more preferably between 150 m²/g and 250 m²/g. The total pore volume of the alumina from which the support is prepared is generally between 0.4 ml/g and 1.2 ml/g, and preferably between 0.45 ml/g and 1 ml/g.

The pore distribution of the pores in the alumina from which the support is prepared may be of monomodal, bimodal or plurimodal type. Preferably, it is of monomodal type. The pore size is about from 2 to 50 nm, with an average pore size between 5 and 25 nm, preferably between 8 and 20 nm.

The characteristics of the alumina mentioned above correspond to the characteristics of the alumina from which the support is prepared, that is to say before the introduction of the silica, of the metals M and optionally M' for the formation of the spinel phase and the active phase.

The content of silica in the support varies from 0.5% by weight to 30% by weight, preferably from 1% by weight to 25% by weight, and more preferably still from 1.5% to 20% by weight relative to the weight of the support.

A support containing alumina and silica is understood to mean a support in which the silicon and the aluminium are in the form of agglomerates of silica or alumina respectively, amorphous aluminosilicate or any other mixed phase containing silicon and aluminium. Preferably, the alumina and the silica are present in the form of a mixture of oxides $SiO_2$—$Al_2O_3$, named silica-alumina. Silica-alumina is understood to mean an alumina comprising a percentage of silica strictly greater than 10% by weight, extending up to 30% by weight relative to the weight of the support. Said silica-alumina is homogeneous on the micrometre scale, and even more preferably homogeneous on the nanometre scale.

The spinel phase present in the oxide support is a partial or non-partial single spinel phase $MAl_2O_4$ or mixed spinel phase $M_xM'_{(1-x)}Al_2O_4$ in which M and M' are distinct metals selected from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values of 0 and 1 themselves being excluded.

The use of phases of spinel structures of type $MAl_2O_4$ or mixed spinel structures $M_xM'_{(1-x)}Al_2O_4$ was described in documents FR2879478 et WO 2005/072866, M and M' generally being divalent metals such as Mg, Sn, Ni, Co, Cu. Mention may also be made of the publications by Rotal et al. in Journal of the European Ceramic Society 33 (2013) 1-6 and Rytter et al. in Top. Catal. 54 (2011) 801-810. In this case, the divalent metal (especially nickel) is introduced in the form of a precursor of nitrate type, for example at an amount of a few percent, to the initial support containing alumina. By calcining at very high temperature, the spinel phase is formed and stabilizes the whole of the support.

Very preferably, M is cobalt or nickel in the case of a single spinel. Very preferably, M is cobalt and M' is magnesium or zinc in the case of a mixed spinel.

Particularly preferably, the spinel phase is a single spinel $MAl_2O_4$ in which M is cobalt.

The content of the spinel phase is generally between 3 and 50% by weight and preferably between 5 and 40% by weight relative to the weight of the support.

The content of metal M or M' is between 1 and 20% by weight and preferably between 2 and 10% by weight relative to the weight of the support.

The formation of the single or mixed spinel structure in said support, often referred to as the support stabilization step, may be carried out by any method known to those skilled in the art. It is generally carried out by introducing the metal M or M' in the form of a salt precursor, for example of nitrate type, to the initial support containing alumina. By calcining at very high temperature, the spinel phase, in which the metal M or M' are in aluminate form, is formed and stabilizes the whole support.

The presence of a spinel phase in the catalyst used in the Fischer-Tropsch process according to the invention is measured by temperature-programmed reduction (or TPR) such as for example described in Oil & Gas Science and Technology, Rev. IFP, Vol. 64 (2009), No. 1, pp. 11-12. According to this technique, the catalyst is heated in a stream of a reducing agent, for example in a stream of dihydrogen. The measurement of the dihydrogen consumed as a function of the temperature gives quantitative information regarding the reducibility of the species present. The presence of a spinel phase in the catalyst is thus expressed by a consumption of dihydrogen at a temperature above around 800° C.

Preferably, the oxide support containing alumina, silica, at least one spinel as described above is a silica-alumina in which the spinel is included, said support preferably having a silica content between 0.5% by weight to 30% by weight relative to the weight of the support, said support also comprising at least one spinel as described above. Preferably, the silica content is greater than 10% by weight, extending up to 30% by weight relative to the weight of the support, said support further comprising at least one spinel as described above.

The specific surface area of the oxide support containing alumina, silica and at least one spinel as described above is generally between 50 m²/g and 500 m²/g, preferably between 100 m²/g and 300 m²/g, more preferably between 150 m²/g and 250 m²/g. The pore volume of the support is generally between 0.3 ml/g and 1.2 ml/g, and preferably between 0.4 ml/g and 1 ml/g.

The support on which said active phase is deposited may have a morphology in the form of beads, extrudates (for example of trilobe or quadrilobe shape) or pellets, especially when said catalyst is used in a reactor operating as a fixed bed, or may have a morphology in the form of a powder of variable particle size, especially when said catalyst is used in a slurry bubble column.

The specific surface area of the catalyst containing the active phase and the oxide support containing alumina, silica and at least one spinel as described above is generally between 50 m²/g and 500 m²/g, preferably between 80 m²/g and 250 m²/g, more preferably between 90 m²/g and 150 m²/g. The pore volume of said catalyst is generally between 0.2 ml/g and 1 ml/g, and preferably between 0.25 ml/g and 0.8 ml/g. Preferably, the pore distribution is monomodal.

Preferably, the catalyst contains an active phase comprising cobalt, and a support made of silica-alumina in which a spinel is included, the silica content of the support preferably being between 1.5 and 20% by weight relative to the weight of the support, said spinel phase being a partial or non-partial single spinel $MAl_2O_4$ or mixed spinel $M_xM'_{(1-x)}Al_2O_4$ in which M and M' are distinct metals selected from the group consisting of magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values of 0 and 1 themselves being excluded.

Particularly preferably, the catalyst employed for carrying out the Fischer-Tropsch process according to the invention is a catalyst in which the active phase consists of cobalt, and optionally platinum, and the oxide support consists of a silica-alumina in which said spinel phase is included, the silica content of the support is between 1.5% and 20% by weight relative to the weight of the support, said spinel phase being $CoAl_2O_4$.

Description of the Fischer-Tropsch Synthesis Process

Prior to its use in the catalytic reactor and the implementation of the Fischer-Tropsch process according to the invention, the dried catalyst obtained in step d) or the calcined catalyst obtained in step e) advantageously undergoes a reductive treatment, for example with pure or dilute hydrogen, at high temperature. This treatment makes it possible to activate said catalyst and to form particles of cobalt metal in the zero-valent state. The temperature of this reductive treatment is preferentially between 200 and 500° C. and the duration thereof is between 2 hours and 20 hours.

This reductive treatment is carried out either in situ (in the same reactor as the one where the Fischer-Tropsch reaction is carried out according to the process of the invention), or ex situ before being loaded into the reactor.

The Fischer-Tropsch process according to the invention leads to the production of essentially linear and saturated $C_5^+$ hydrocarbons (having at least 5 carbon atoms per molecule). The hydrocarbons produced by the process of the invention are thus essentially paraffinic hydrocarbons, the fraction of which having the highest boiling points can be converted with a high yield to middle distillates (gas oil and kerosene cuts) by a hydroconversion process such as catalytic hydrocracking and/or hydroisomerization.

The feedstock used for the implementation of the process of the invention comprises synthesis gas. Synthesis gas is a mixture comprising in particular carbon monoxide and hydrogen having $H_2/CO$ molar ratios that may vary in a ratio of 0.5 to 4 depending on the process by which it was obtained. The $H_2/CO$ molar ratio of the synthesis gas is generally close to 3 when the synthesis gas is obtained from the hydrocarbon or alcohol steam reforming process. The $H_2/CO$ molar ratio of the synthesis gas is of the order of 1.5 to 2 when the synthesis gas is obtained from a partial oxidation process. The $H_2/CO$ molar ratio of the synthesis gas is generally close to 2.5 when it is obtained from a thermal reforming process. The $H_2/CO$ molar ratio of the synthesis gas is generally close to 1 when it is obtained from a process for gasification and reforming of $CO_2$.

The catalyst used in the hydrocarbon synthesis process according to the invention may be implemented in various types of reactors, for example fixed-bed, moving-bed, ebullated-bed or else three-phase fluidized-bed reactors. The implementation of the catalyst suspended in a three-phase fluidized reactor, preferentially of bubble column type, is preferred. In this preferred implementation of the catalyst, said catalyst is divided in the form of a very fine powder, particularly of the order of a few tens of microns, this powder forming a suspension with the reaction medium. This technology is also known under the "slurry" process terminology by those skilled in the art.

The hydrocarbon synthesis process according to the invention is performed under a total pressure of between 0.1 and 15 MPa, preferably between 0.5 and 10 MPa, under a temperature of between 150 and 350° C., preferably between 180 and 270° C. The hourly space velocity is advantageously between 100 and 20 000 volumes of synthesis gas per volume of catalyst and per hour (100 to 20 000 $h^{-1}$) and preferably between 400 and 10 000 volumes of synthesis gas per volume of catalyst and per hour (400 to 10 000 $h^{-1}$).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 18/71.301, filed Oct. 25, 2019, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A Fischer-Tropsch process for preparing a catalyst and synthesizing hydrocarbons using the catalyst, which comprises:
preparing the catalyst by the following steps:
a) providing a porous support containing silica, alumina, and at least one partial or non-partial single spinel phase $MAl_2O_4$ or mixed spinel phase $M_xM'_{(1-x)}Al_2O_4$ in which M and M' are distinct metals selected from the group consisting of magnesium (Mg), copper (Cu), cobalt (Co); nickel (Ni), tin (Sn), zinc (Zn), lithium (Li), calcium (Ca), caesium (Cs), sodium (Na), potassium (K), iron (Fe), and manganese (Mn) and in which x is between 0 and 1, the values of 0 and 1 themselves being excluded;
b) adding at least one organic compound containing oxygen and/or nitrogen and comprising one or more chemical functions selected from the group consisting of carboxylic, alcohol, ester, amine, amide, ether, dilactone, carboxyanhydride, aldehyde, ketone, nitrile, imide, oxime and urea functions, but not comprising sulfur, to the porous support;
c) bringing said porous support into contact with at least one solution containing at least one salt of a precursor of the phase comprising at least one Group VIII metal selected from the group consisting of iron (Fe) and cobalt (Co);
d) drying the porous support obtained at the end of step c);
wherein step b) is carried out before or after steps c) and d) and is carried out by bringing together said porous support with a porous solid comprising said at least one organic compound containing oxygen and/or nitrogen under conditions of temperature, pressure and duration such that a fraction of said organic compound is transferred in the gaseous state from said porous solid to the porous support; and
using the catalyst obtained from the above steps to prepare hydrocarbons by bringing the catalyst into contact with a feedstock comprising synthesis gas under a total pressure of between 0.1 and 15 MPa, under a temperature of between 150 and 350° C., at an hourly space velocity of between 100 and 20,000 volumes of synthesis gas per volume of catalyst per hour and with an $H_2/CO$ molar ratio of the synthesis gas of between 0.5 and 4.

2. The process according to claim 1, wherein step b) is carried out by bringing said porous support together with said porous solid comprising said organic compound, without physical contact.

3. The process according to claim 1, wherein, in step b), the porous support and the porous solid comprising said organic compound are of different porosity and/or chemical nature.

4. The process according to claim 1, wherein, at the end of step b), the porous solid containing the organic compound is separated from said porous support and is returned to step b).

5. The process according to claim 1, wherein said organic compound comprises at least one carboxylic function selected from the group consisting of ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

6. The process according to claim 1, wherein said organic compound comprises at least one alcohol function selected from the group consisting of methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

7. The process according to claim 1, wherein said organic compound comprises at least one ester function selected from the group consisting of a γ-lactone or a δ-lactone containing between 4 and 8 carbon atoms, γ-butyrolactone, γ-valerolactone, methyl laurate, dimethyl malonate, dimethyl succinate and propylene carbonate.

8. The process according to claim 1, wherein said organic compound comprises at least one amine function selected from the group consisting of aniline, ethylenediamine, diaminohexane, tetramethylenediamine, hexamethylenediamine, tetramethylethylenediamine, tetraethylethylenediamine, diethylenetriamine and triethylenetetramine.

9. The process according to claim 1, wherein said organic compound comprises at least one amide function selected from the group consisting of formamide, N-methylformamide, N,N-dimethylformamide, 2-pyrrolidone, N-methyl-2-pyrrolidone, gamma-valerolactam and N,N'-dimethylurea.

10. The process according to claim 1, wherein said organic compound comprises at least one carboxyanhydride function selected from the group consisting of the O-carboxyanhydrides consisting of 5-methyl-1,3-dioxolane-2,4-dione and 2,5-dioxo-1,3-dioxolane-4-propanoic acid, and the N-carboxyanhydrides consisting of 2,5-oxazolidinedione and 3,4-dimethyl-2,5-oxazolidinedione.

11. The process according to claim 1, wherein said organic compound comprises at least one dilactone function selected from the group consisting of the cyclic dilactones having 4 ring members consisting of 1,2-dioxetanedione, the cyclic dilactones having 5 ring members consisting of 1,3-dioxolane-4,5-dione, 1,5-dioxolane-2,4-dione, and 2,2-dibutyl-1,5-dioxolane-2,4-dione, the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, and the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

12. The process according to claim 1, wherein said organic compound comprises at least one ether function comprising at most two ether functions and not comprising any hydroxyl groups, selected from the group consisting of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, and the cyclic ethers consisting of tetrahydrofuran, 1,4-dioxane and morpholine.

* * * * *